UNITED STATES PATENT OFFICE.

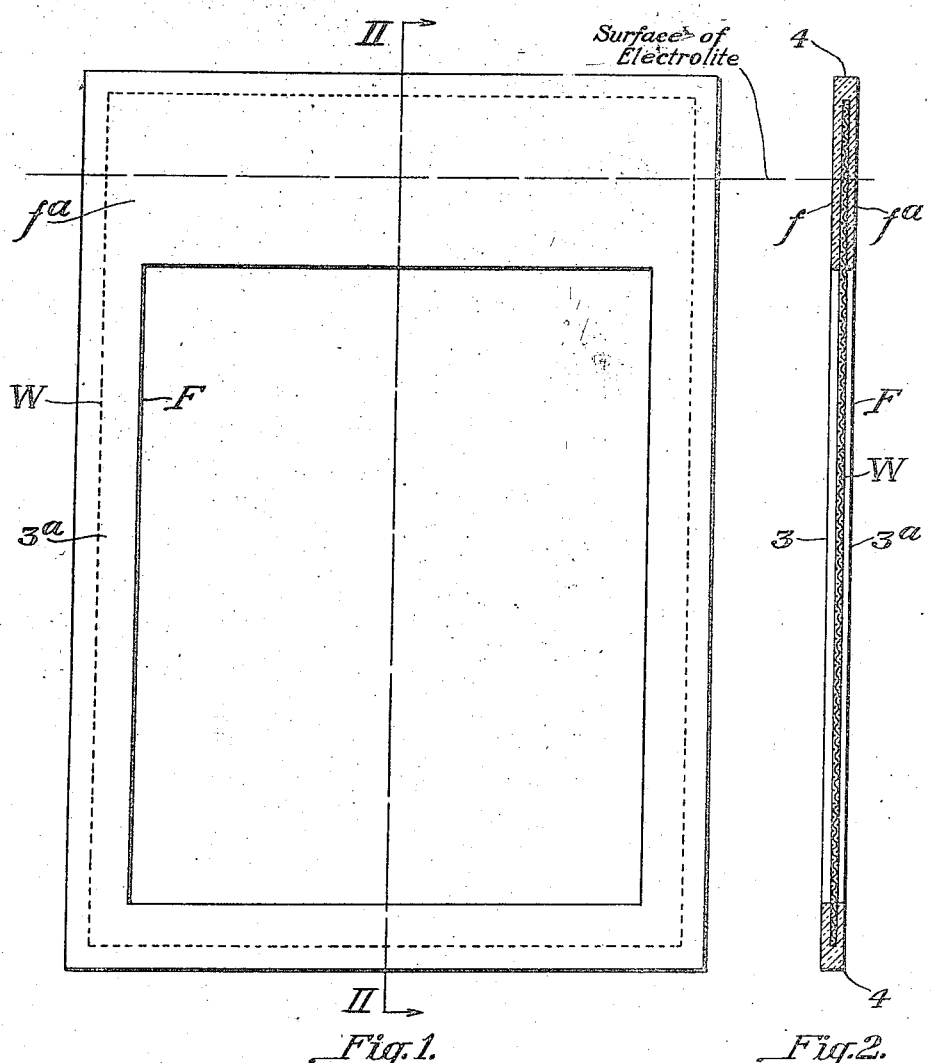

PAUL E. NORRIS, OF PITTSBURGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

SEPARATOR FOR STORAGE BATTERIES.

1,386,650.   Specification of Letters Patent.   Patented Aug. 9, 1921.

Application filed March 10, 1920. Serial No. 364,660.

*To all whom it may concern:*

Be it known that I, PAUL E. NORRIS, a citizen of the United States, residing at Pittsburgh, in the county of Allegheny and State of Pennsylvania, have invented certain new and useful Improvements in Separators for Storage Batteries, of which the following is a specification.

My invention relates to storage battery separators, and particularly to separator for batteries of the lead and acid type.

One object of my invention is the provision of a separator having the advantages of woolen material without the disadvantages due to the lack of rigidity of such material and the rapid deterioration of such material at and above the surface of the battery electrolyte.

I will describe one form of separator embodying my invention, and will then point out the novel features thereof in claims.

In the accompanying drawing, Figure 1 is a view showing in front elevation one form of separator embodying my invention, and Fig. 2 is a sectional view of the separator on the line II—II of Fig. 1 looking in the direction of the arrows.

Similar reference characters refer to similar parts in each of the views.

Referring to the drawings, the separator comprises a hollow rectangular frame F of hard rubber, celluloid, or other suitable comparatively rigid insulating material, which frame supports a sheet W of woolen material. The sheet W may be, for examples, wool cloth or wool felt, and in either case, it is preferably sliced from a block of such material.

One process of constructing the separator is as follows: The frame F comprises two sections 3 and 3$^a$ which are exactly alike and the length and width of which are somewhat greater than the corresponding dimensions of the woolen sheet W. These two frame sections are placed side by side with the sheet W between them, and the sections are then vulcanized together, or otherwise united, around the outside edges as at 4, 4 in Fig. 2.

I have found that woolen material makes a desirable separator for lead and acid batteries except that such material is not rigid, and is subject to rapid deterioration at and above the surface of the electrolyte. Hard rubber, celluloid and the like, are not subject to these disadvantages. To avoid the latter difficulty I make the upper cross bars $f$ and $f^a$ of the frame F comparatively deep so that they extend well down below the surface of the electrolyte, thereby protecting the sheet W from the action of the electrolyte at and above the surface thereof. The frame F is, of course, comparatively rigid, and so it prevents collapse or bulging of the inherently flimsy woolen material W.

Although I have herein shown and described only one form of separator embodying my invention, it is understood that various changes and modifications may be made therein within the scope of the appended claims without departing from the spirit and scope of my invention.

Having thus described my invention, what I claim is:

1. A storage battery separator comprising a frame of comparatively rigid material and a sheet of woolen material supported by said frame.

2. A storage battery separator comprising a frame of comparatively rigid material not subject to rapid deterioration by the action of the battery electrolyte, and a sheet of woolen material supported by said frame.

3. A storage battery separator comprising a frame of material not subject to rapid deterioration by the battery electrolyte, and a sheet of woolen material supported by said frame.

4. A storage battery separator comprising a frame of material not subject to rapid deterioration by the battery electrolyte at and above the surface of the latter, said frame having a part extending from the top of the separator to a line below the surface of the electrolyte, and a sheet of woolen material supported by said frame.

5. A storage battery separator comprising a hollow rectangular frame of comparatively rigid material, and a sheet of woolen material supported by said frame.

6. A storage battery separator comprising two similar frame sections placed side by side with a sheet of woolen material between them, the outside dimensions of each frame section being less than the outside dimensions of the woolen sheet, and the outer edges of said frame sections being united.

7. The process of constructing a storage battery separator which consists in placing two similar frame sections side by side with a sheet of woolen material between them, and uniting said frame sections along the outer edges.

8. A storage battery separator comprising a sheet of woolen material, and means for protecting said sheet from the action of the battery electrolyte at and above the surface of the electrolyte.

9. A storage battery separator comprising a sheet of woolen material located below the surface of the electrolyte, and a member of other material located at and above the surface of the electrolyte, said latter material being not subject to rapid deterioration by the electrolyte at and above the surface of the latter.

In testimony whereof I affix my signature,

PAUL E. NORRIS.